United States Patent [19]
Cardinaud et al.

[11] Patent Number: 5,861,459
[45] Date of Patent: Jan. 19, 1999

[54] AQUEOUS SILICONE DISPERSION CAPABLE OF BEING CROSS-LINKED INTO AN ADHESIVE ELASTOMER USING A CONDENSATION REACTION MECHANISM

[75] Inventors: Denis Cardinaud, Villeurbanne; Michel Feder, Zillisheim; Christian Fischer, Luzinay, all of France

[73] Assignee: Rhone-Poulenc Chimie, Courbevoie Cedex, France

[21] Appl. No.: 809,077

[22] PCT Filed: Sep. 14, 1995

[86] PCT No.: PCT/FR95/01182

§ 371 Date: May 2, 1997

§ 102(e) Date: May 2, 1997

[87] PCT Pub. No.: WO96/08529

PCT Pub. Date: Mar. 21, 1996

[30] Foreign Application Priority Data

Sep. 16, 1994 [FR] France ..................................... 9411410

[51] Int. Cl.$^6$ ...................................................... C08L 83/08
[52] U.S. Cl. .............................. 524/838; 578/17; 578/18; 578/38
[58] Field of Search ............................... 524/838; 578/17, 578/18, 38

[56] References Cited

U.S. PATENT DOCUMENTS

| 4,191,817 | 3/1980 | Schiller et al. | 528/38 |
| 4,559,385 | 12/1985 | Huhn et al. | 524/838 |
| 5,204,432 | 4/1993 | Saito et al. | 528/10 |
| 5,336,419 | 8/1994 | Coffindaffer et al. | 252/8.6 |

*Primary Examiner*—Margaret W. Glass
*Attorney, Agent, or Firm*—Burns, Doane, Swecker & Mathis, L.L.P.

[57] ABSTRACT

The present invention relates to an aqueous silicone dispersion, capable of being cross-linked into an elastomer by removing water and optionally alcohol and/or carboxylic acid, said dispersion being based on at least one polyorganosiloxane (A) having at least two condensable or hydrolysable $OR^a$ groups per molecule wherein $R^a$=H or alkyl, as well as at least one surfacant (B). The technical problem consisting of perfecting a stable dispersion capable of being cross-linked into an elastomer that is highly adhesive on any support and that has suitable and economic mechanical properties is solved since this dispersion includes an amino-functionalised polyorganosiloxane (C) of the DTT(N)(OMe) resin type redistributed with aminoethylaminopropyltrimethoxysilane, optionally at least one hydroxylated and/or alkoxylated silicone resin (D), optionally at least on alkoxysilane (E) donating the -$OR^a$ terminals of the polydiorganosiloxane (A), optionally at least on condensation catalyst (F) and optionally at least one optionally siliceous filler (G).

25 Claims, 1 Drawing Sheet

FIG. 1

FIG. 2

AQUEOUS SILICONE DISPERSION CAPABLE OF BEING CROSS-LINKED INTO AN ADHESIVE ELASTOMER USING A CONDENSATION REACTION MECHANISM

TECHNICAL FIELD

The field of the present invention is that of silicone compositions which can be hardened by cross-linking and which are usable especially as a mastic or any other sealing material, or for forming any type of coating for example in paintings.

More specifically, the invention relates to an aqueous silicone dispersion which forms an adhesive elastomer by removing especially water and optionally alcohol and/or carboxylic acid, using a polycondensation mechanism which intervenes advantageously at ambient temperature.

PRIOR ART

The silicones or polyorganosiloxanes, such as $\alpha,\omega$-(dihydroxy)polydiorganosiloxane, are known to enter into the composition of standard silicone mastics which further include cross-linking agents of the alkyltrialkoxysilane type, polycondensation catalysts of the tin salt type and fillers. Such compositions have not proved to be very convenient in their use for carrying out sealing joints, films or coatings for example, since their pasty and viscous states render their handling and their placing in a given shape difficult.

Moreover, these compositions have the disadvantage in that they are not dispersible or soluble in water which complicates their use, particularly because the tools used for their application are not in fact easily washable in water.

Furthermore, these compositions have also the disadvantage in that they are not << paintable >>; the paints do not stick on.

In order to alleviate these serious faults, systems of formation of mastic or cross-linkable film have been developed from an aqueous emulsion based on silicone oil capable of being cross-linked into an elastomer by condensation (water removal for example).

Although of a more practical application, these aqueous silicone emulsions have raised a certain number of technical difficulties:

stability in storage, hardening times too long, mediocre mechanical properties (hardness, elasticity), thixotropy flaws, weak adhesion properties on usual supports.

Various prior art propositions have attempted to satisfy, in vain, such specifications.

It is thus known from the German patent application No 2 912 431, of a polyorganosiloxane latex obtained from an emulsion, within which the polymerisation of a cyclic organosiloxane intervenes leading to a polysiloxane with OH terminals. This emulsion also includes an organo-functional trialkyoxysilane which is useful as a cross-linking agent. These known compositions do not give satisfaction in what concerns the stability of the emulsion and the adhesive properties.

The German patent application No. 3 019 655 describes a silicone emulsion which, after water removal, may be converted into an elastomer under ambient conditions. This silicone emulsion also includes amorphous silica which is introduced in the form of a colloidal dispersion. Now, such silica dispersions are not particularly stable and so the pH of the mixture is a critical parameter which is very difficult to fix. Furthermore, the incorporation of silica is at the origin of a certain inhomogeneity in the hardness of the obtainable cross-linked elastomer. This is due to the fact that the silica has in fact a tendency to react in a parasite fashion with the reactive OH terminals of the silicone oil.

In other prior propositions, the siliceous filler is sodium silicate (U.S. Pat. No. 4,244,849) or powdered amorphous silica (FR No. 2 463 163).

These last three patents teach that in order to obtain a monocomponent emulsion which is stable in storage, it is necessary to fix its pH at values equal to or greater than 8.5 or 9, preferably 10. However, the processes according to these patents do not live up to the expectations of the technical field as regards stability and mechanical and adhesive properties.

German patent application No 2 943 832 describes a silicone emulsion which differs from that which is the subject of the German patent application No 3 019 655 studied above only by a higher dry matter content (>60%). A great disadvantage of this emulsion is that it must have a pH greater than 9, this disadvantage being further marked by the fact that the pH is fixed with the aid of an amine which causes a nuisance, particularly a strong-smelling one. Finally, the resilience and adhesive properties of this known silicone emulsion remain mediocre.

The European patent application No 0 266 729 discloses a silicone emulsion capable of being cross-linked into an elastomer by condensation which includes an $\alpha,\omega$-dihydroxypolydiorganosiloxane, a surficant which allows obtaining an emulsion, a hardening catalyst and a cross-linking agent formed by a silicone resin of the siliconate type, optionally associated with a hydroxylated silicone resin comprising up to 10% by weight of OH radicals. The pH of this emulsion is greater than 8. Although this alkalinity obtains slightly better results from the point of view of adhesion, the solution proposed by this European patent application do not appear as being satisfactory.

The U.S. Pat. No. 4,554,187 proposes a silicone emulsion which is capable of being converted into an elastomer under ambient conditions by removing water and alcohol and which comprises a polyorganosiloxane with hydroxy terminals, a reactive alkoxy- or acyloxy-functionalised silicone resin which is useful as a cross-linking agent, a catalyst of the organotin salts type, thixotropic fillers of siliceous nature or not and non-thixotropic fillers such as $Ca(OH)_2$, the dry extract of this emulsion being between 20 and 85%. The acyloxy- or alkoxy-functional cross-linking silicone resin may be a non-aminated methyl or methoxysilicone resin of formula $CH_3 Si (O)_{1.1} (OCH_3)_{0.8}$. This resin is introduced in the form of an emulsion. The compositions according to this U.S. patent necessarily contain an anionic surficant, imposed by the methodology of preparation of dihydroxylated silicone oil by polymerisation into an emulsion. Such an anionic surficant harms the stability of the emulsion. It is also to be noted that the presence of the acyloxy- or alkoxy-functionalised cross-linking silicone resin is an inhibiting factor of the polymerisation into emulsion as soon as it is added before the polymerisation step. Consequently, this technical proposition is not satisfactory and even less so than the performances as regards resilience, elasticity and adhesion are weak.

European patent application No 0 359 676 relates to aqueous dispersions capable of being cross-linked which are usable especially as a mastic, and which comprise a hydroxylated silicone resin as a cross-linker of an $\alpha$, ω-(dihydroxy) polydiorganosiloxane oil, said cross-linking taking place in the presence of a stannous condensation catalyst. It turns out to be that these emulsified compositions are not very adhesive, particularly on glass. At a neutral or acidic pH, their adherence is even nil.

The European patent No 0 572 006 relates to aqueous dispersions of polyorganosiloxanes, which have as vocation to be stable in storage and ready to use. These cross-linkable aqueous dispersion comprise a POS α,ω-dihydroxylated (α,ω-diOH-PDMS), a tin salt as condensation catalyst, a POS resin with D and T motifs of PM<20000, an aminated silicon-containing compound and polyvinyl alcohol.

The aminated silicon-containing compound may be monosilalalkoxylated and aminated or a POS with MD or MDT motif and not alkoxylated.

This dispersion does not comprise any surficant.

The performances of this cross-linkable silicone aqueous dispersion, especially from the point of view of adhesion, remain perfectible.

The European patent application No 0 201 284 describes pasty aqueous silicone emulsions which are stable in storage and useful as a sealing material. These emulsions contain an emulsion of an α,ω-dihydroxylated POS which is stabilised in an emulsion by an anionic surficant, a tin condensation catalyst, a monosilane type cross-linking agent, a non-silicic inert filler and optionally an adhesion promoter of the aminoalkylalkoxymonosilane type.

The use of such an adhesion promoter does not allow attaining the extremely satisfactory results from this point of view.

BRIEF DESCRIPTION OF THE INVENTION

In this factual state, one of the essential objectives of the present invention is to propose an aqueous silicone dispersion (emulsion).

fit to cross-link into an elastomer by removal of water and/or alcohol and/or a carboxylic remains of the alkoxy type, especially under ambient atmospheric conditions, and putting right the known lacunas and disadvantages of the known emulsions of his type.

More particularly, the present invention aims to optimise the adhesive properties on any usual support: glass, concrete, wood, metals - aluminium - ceramics . . . , without sacrificing the other technical specifications, especially the stability, the elasticity, the resilience, the hardness, the mechanical resistance and the moderateness of the cost price.

Another objective of the present invention is to propose an aqueous silicone dispersion capable of being cross-inked by condensation, which cross-links correctly and sufficiently rapidly into an elastomer which retains its mechanical properties during its ageing.

Another objective of the invention is to propose an aqueous silicone dispersion of the type described above, which leads to an elastomer which has an improved flame resistance.

Another objective of the invention is to provide an aqueous silicone dispersion which is easy to handle and model, especially in view of the applications of the mastic, sealing material, joint, implementation of film or of various coatings type.

Another objective of the invention is to provide a mastic, a sealing material, a film or various coatings (adhesive), comprising the above-mentioned dispersion and/or the cross-linked elastomer which is derived therefrom.

These and other objectives are attained by the present invention, which proceeds from the evidencing, after long studies and experimentation, and in a manner which is entirely surprising and unexpected, that the incorporation of an aminated silicon-containing compound into a silicone emulsion gives mechanical qualities as well as adhesive properties to the cross-linked elastomer obtained by cross-linking the aqueous silicone emulsion under consideration. The high physicochemical stability is also an advantage and a characteristic of this latter.

It follows that the present invention relates to an aqueous silicone dispersion which is capable of being cross-linked into an elastomer by the removal especially of water and optionally alcohol and/or carboxylic acid, said dispersion being based on:

A. at least one polyorganosiloxane (A) which has at least two condensable or hydrolysable $Or^a$ groups per molecule, with $R^a$=H or alkyl, B. and at least one surfactant (B), C. at least one aminated silicon-containing compound (C) formed from several recurring units of the following average formula (I):

$$R^1_x R^2_y (OR^3)_z SiO_{4-(x+y+z)/2}$$

in which:

$R^1$ represents a monovalent group which is free from nitrogen of identical or different nature from one recurring unit to the other, and which corresponds to hydrogen, a $C_1$–$C_6$ alkyl group, an aryl or a $C_2$–$C_8$ alkenyl, optionally substituted preferably with a halogen or halogenated radical $R^1$ being more particularly selected from the group including: H, $C_1$–$C_4$ alkyl optionally halogenated; methyl, ethyl, propyl, 3,3,3-trifluoropropyl, vinyl, allyl and phenyl groups being more particularly preferred;

$R^2a$ represents a monovalent hydrocarbon group which is linked to the silicon by an Si—C bond and which contains at least one nitrogen atom, $R^2$ being of identical or different nature from one recurring unit to the other;

$R^3$ is a hydrocarbon group which comprises from 1 to 18 carbon atoms and, preferably, is of the same definition as that given above for $R^1$.

x, y and z are integers or positive decimals lower than 4, and x+y+z<4

D. optionally at least one hydroxylated and/or alkoxylated silicone resin (D)

E. optionally at least one alkoxysilane (E) donating the -$OR^a$ terminals of the polydiorganosiloxane (A)

F. optionally at least one condensation catalyst (F)

G. and optionally at least one optionally siliceous filler (G).

characterised in that it contains at least one aminated silicon-containing compound (C) selected from the family of its alkoxylated derivatives and formed from many units (I), i.e. (C) comprises (I) units in which z>0, preferably z<2 and even more preferentially 0.2<z≦1.5.

By these means, the Applicant has had the credit in obtaining silicone compositions in aqueous dispersion which are capable of being cross-linked into a highly adhesive elastomer which constituted, a priori, a particularly insurmountable technical obstacle.

The hardened elastomers derived from the aqueous silicone dispersions according to the invention possess a level of adhesion on glass which is very much greater than those obtained with the known aqueous silicone dispersions. This superiority is verified even in the case of weakly acidic compositions which are all the same synonymous with mediocre adhesion.

Furthermore and against all expectations, the implementation of the amino-functionalised additive (C) has no negative repercussion, especially from the point of view of odours and eventual undesirable coloration.

DETAILED DESCRIPTION OF THE INVENTION

Preferably, the aminated silicon-containing compound is a resin which has an average functionality in silicon greater than 2, which corresponds to x+y<2 in formula x and y being preferably respectively lower than 2, than 1 and than 1.5;

x and y being even more preferentially comprised between 1 and 1.8, between 0.1 and 0.8, and between 0.2 and 1.2

This amino-functionalised silicone resin (C) can optionally be at least in part replaced by its polyorganosiloxanic precursors on the one hand, and aminoalkylated ones on the other hand.

The interest of this amine group-comprising silicone resin, which is optionally salified and incorporated in the dispersion in accordance with the invention, probably originates from the fact that it constitutes an adhesion promoter which is particularly well dispersed and which is in the optimal physicochemical form for the effect sought-after. It can in fact diffuse easily towards the support/dispersion interface in order to be able to exercise its adhesive action therein to the detriment of the surficant present in the dispersion and which has an antagonistic effect in this respect. The amino-functional resin acts in competition with the surficants.

The aqueous dispersion according to the invention is presented as a biphasic emulsion in which the continuous phase is constituted by water and the discontinuous phase is constituted especially by the polyorganosiloxane silicone oil.

In accordance with a first preferred embodiment of the invention, the aminated silicon-containing compound is a polyorganosiloxane formed by a copolymer which comprises the following recurring motifs: D T T (N (OR$^3$) with:

motif $D=R^1{}_2Si\ O_{2/2}$
motif $T=R^1Si\ O_{3/2}$
motif $T(N)=R^2\ Si\ O_{3/2}$ in which $R^1$, $R^2$ and $R^3$ are such as defied above and the terminal -OR$^3$ radicals are carried by D and/or T and/or T(N), in that the molar ratio D/D+T is lower than or equal to 100%, preferably 50% and is even more preferentially between 5 and 50%, in that the Z parameter of the formula (I) [moles of OR$^3$/mole of Si] is between 0,4 and 1.00, and in that the mass percentage of nitrogen 14 with respect to the totality of the polyorganosiloxane (A) is greater than or equal to 0.5%, preferably 1% and is even more preferentially between 1 and 3%.

According to a second preferred embodiment of the invention, the aminated silicon-containing compound is a polyorganosiloxane formed by a copolymer which comprises the following recurring motifs: D Q T (N) (OR$^3$) with:

motif $D=R^1{}_2Si\ O_{2/2}$
motif $T(N)=R^2Si\ O_{3/2}$
motif $Q=Si\ O_{4/2}$ in which $R^1$, $R^2$ and $R^3$ are such as defined above, [Formula (I)] and the terminal radicals —OR$^3$ are carried by D and/or T(N), in that the molar ratio D/D+Q is lower than or equal to 70%, preferably 50% and is even more preferentially between 5 and 50%, in that the z parameter of the formula (I) [moles of OR$^3$/mole of Si] is between 0.4 and 1.00, in that the mass percentage of nitrogen 14 with respect to the totality of the polyorganosiloxane (A) is greater than or equal to 0.5%, preferably 1% and is even more preferentially between 1 and 3%.

According to a third preferred embodiment of the invention, the animated silicon-containing compound is a polyorganosiloxane formed by a copolymer which comprises the following recurring motifs: D T D (N) (OR$^3$) with:

motif $D=R^1{}_2Si\ O_{2/2}$
motif $D(N)=R^1R^2Si\ O_{2/2}$
motif $T=R^1Si\ O_{3/2}$ in which $R^1$, $R^2$ and $R^3$ are such as defined above, [Formula (I)] and the terminal —OR$^3$ radicals are carried by D and/or TN in that the molar ratio D/D+T is lower than or equal to 100%, preferably 50% and is even more preferentially between 5 and 50%, in that the z parameter of the formula (I) [moles of OR$^3$/mole of Si] is between 0.4 and 1.00, and in that the mass percentage of nitrogen 14 with respect to the totality of the polyorganosiloxane (A) is greater than or equal to 0.5%, preferably 1% and is even more preferentially between 1 and 3%.

The symbols T(N) or D(N) in the above formulae of the recurring motifs indicate that the amine functionality is carried by at least one T or D motif according to the case.

Without it being limiting, it may be specified that the R$^2$ radical of the formula (I) is advantageously of the following formula: $(R^4)_2\ NR^5$ in which:

the R$^4$ groups are identical or different and represent hydrogen or —R$^6$—NH$_2$, the R$^5$ and R$^6$ groups being divalent C$_1$–C$_{10}$ alkylene radicals, which are optionally substituted, or even the R$^4$ groups are different from hydrogen and together form a 5–7 membered ring containing at least one heteroatom, preferably nitrogen or oxygen.

Thus, in the case where it does not contain any cyclised R$^4$, the amino-functionalised R$^2$ radical may be, e.g.; NH$_2$—(CH$_2$)$_2$—NH—(CH$_2$)$_3$—or NH$_2$—CH$_2$—CH$_2$—CH$_2$—

In the opposite case, the N (R$^4$)$_2$ radical may, for example, correspond to:

with R$^{4'}$=H or alkyl, preferably a C$_1$–C$_{10}$ allyl.

It is to be noted that the cyclisation of the two R$^4$ radicals in the heterocycle is a phenomenon which can intervene within the dispersion, e.g. after mixing all its constituents.

Further, it goes without saying that the dispersion is not limited to one sole type of amine substitute R$^2$ for the additive (C). In fact, it is perfectly conceivable to include $R^2$ radicals of a different nature.

According to an interesting method of the invention, the aminated silicon-containing compound (C), which is preferably of resin-type structure, is salified and includes one or some $R^2$ radicals of the following formula:
—$R^5N^+(R^4)_3$, $X^-$
with $R^4$ and $R^5$ such as defined above and X representing a counter-anion selected from the carboxylates and halides, preferably from the following products: lactate, acetate, chloride.

This salified aminoalkylated silicone resin (C) is thus found in the aqueous continuous phase of the dispersion, the pH being selected in such a way that the resin (C) is maintained in the ionised form. The choice of pH is made, in a way known per se, according to the pKa of the acid corresponding to the counter-anion implemented.

Given that this resin is ionised, it may be introduced in the aqueous continuous phase of the dispersion where it is dissolved or very finely dispersed, which favours the stability and the adhesion of the cross-linked product on the usual supports.

In the case where the aminoalkylated silicone resin is not salified, it naturally has vocation to be integrated in the silicone oily phase.

It goes without saying that a variant may perfectly be envisaged in which at least one part of the resin is present in the salified form and at least one other part is in a non-salified form.

The composition of the aqueous silicone dispersion according to the invention is advantageously the following:

(A) - 100 parts by weight of the silicone oil (A) having terminals of formula:
O—Si $(OR^a)_t(R^b)_{3-t}$ in which $R^a$ is such as defined above and $R^b$=H or a $C_1$–$C_6$ hydrocarbon radical preferably (cyclo)alkyl or alkenyl, optionally functionalised, and t=1.2 or 3, this oil having a viscosity η at 25° C. which is greater than or equal to 20 000 mPa.s;

(B) - 0.5 to 10. preferably 2 to 8 parts by weight of the surfactant (B) selected from the ionic, the amphoteric or the non-ionic surfactants, the latter being preferred.

(C)- 0.5 to 10, preferably 0.5 to 7 parts by weight of the aminoalkylated silicone resin (C), optionally salified, (D)- 0 to 20, preferably 0 to 10 parts by weight of at least one hydroxylated silicone resin (D) which has, per molecule, at least two different motifs selected from those of formulae: $R^7_3SiO_{0.5}$, $R^7_2SiO$, $R^7SiO_{1.5}$ and $SiO_2$, the $R^7$ radicals, identical or different, being selected from the vinyl, phenyl, 3,3,3-trifluoropropyl radicals, and the linear or branched alkyl radicals having from 1 to 6 carbon atoms inclusive, said resin having a hydroxyl group content of between 0.1 and 10% by weight.

(E)- 0 to 5, preferably 0 to 3 parts by weight of the alokoxysilane (E) of formula $R^b_{3-t} Si(OR^a)_{t+1}$ in which $R^a$ and $R^b$ are identical or different and are, as for t, such as defined above.

(F)- 0 to 3, preferably 0 to 1.5 parts by weight of the condensation catalyst (F).

(G)- 0 to 250, preferably 0 to 100 parts by weight of the optionally siliceous reinforcing filler.

The essential constituent from a weight point of view is therefore the silicone oil (A) which is preferably a polydiorganosiloxane which has hydroxylated or alkoxylated terminals. The organic groups within the chain of this oil (A) are advantageously selected from the following compounds: hydrogen, $C_1$–$C_3$ (cyclo)alkyl or alkenyl, for example vinyl, allyl or amine.

In the case where $R^a$ is different from H (alkoxyl), the condensation reaction takes place in principle after hydrolysis of the alkoxyl $OR^a$ and/or of the alkoxyl carried by the cross-linking agent.

The α,ω-dihydroxypolydiorganosilooyanes are particularly preferred as product (A). It is nevertheless preferable that the viscosity η at 25° C. of the latter should be at least 100 mPa.s, preferably of at least 50 000 mPas. It is in fact especially for viscosities η greater than 50 000 mPas that an elastomer is obtained which has an entirety of suitable mechanical properties, particularly at the level of Shore hardness A and extension. Further, the higher the viscosity, the more the mechanical properties are kept during the ageing of the cross-linked elastomer which may be obtained from the aqueous dispersion. The selected viscosities η at 25° C. are, in practice, in the framework of the invention, between $5 \times 10^4$ and $15 \times 10^5$ mPa.s.

As an example of compound (A), α, ω-dihydroxy (polydimethylsiloxane) can be cited.

All the viscosities in question in the present account correspond to a size of dynamic viscosity at 25° C. known as "Newtonian", i.e. the dynamic viscosity which is measured in a way known per se has a sufficiently low shearing speed gradient so that the measured viscosity is independent of the speed gradient.

The organic radicals of the α,ω-(dihydroxy) polydiorganopolysiloxanes which are, and it has been seen, monovalent hydrocarbon radicals which contain up to 6 carbon atoms, and which are optionally substituted with cyano or fluoro groups. The substituents generally used in the industrial products due to their availability are the methyl, ethyl, propyl, phenyl, vinyl and 3,3,3-trifluoropropyl radicals. In general at least 80% by number of these radicals are methyl radicals.

In the context of the present invention, the α,ω-(dihydroxy)polydiorganosiloxanes can be specially used which are prepared by the method of anionic polymerisation described in the above-mentioned U.S. patents: U.S. Pat. No. 2,891,920 and above all U.S. Pat. No. 3,294,725 (cited as reference). The polymer obtained is stabilised anionically by a surfactant which, in accordance with the teaching of U.S. Pat. No. 3,294,725 is preferably the alkali metal salt of an aromatic hydrocarbon sulphonic acid, the free acid also playing the role of polymerisation catalyst.

The preferred catalyst and surfactant are dodecylbenzenesulphonic acid or alkylsulphuoric acid and their alkali metal salts particularly their sodium salts. Other anionic or non-anionic surfactants may optionally be added. However, this addition is not necessary since, in accordance with the teaching of U.S. Pat. No. 3,294,725, the amount of anionic surfactant resulting from the neutralisation of the sulphonic acid is sufficient for stabilising the polymer emulsion. This amount is generally lower than 3%, preferably 1.5% of the weight of the emulsion.

This method of polymerisation into an emulsion is particularly interesting since it allows directly obtaining an emulsion containing the oil (A). Furthermore, this method allows the possibility of directly obtaining the α,ω-(dihydroxy)-polydiorganosiloxane (A) in emulsion of very high viscosity without difficulty.

In accordance with the invention, it is nonetheless preferable to start with α,ω-(dihydroxy)polydiorganosiloxane which is already polymerised for the preparation of the emulsion. This is then placed in aqueous emulsion by stabilising the emulsions by an ionic surfactant and/or a non-ionic surfactant in following the method which is well-known to the person skilled in the art and which is described in the literature (see for example the patents FR-A-2 697 021 FR-A-2 064 563, FR-A-2 094 322, FR-A-2 114 230 and EP-A-0 169 098).

According to this method, the α,ω-(dihydroxy) polydiorganosiloxane polymers are mixed by simple stirring with the ionic or non-ionic surfactant, it being possible for the latter to be in aqueous solution. Water is then added and the whole is transformed with the aid of an adequate mixer into an emulsion which is fine (e.g. average granulometry lower than or equal to 5 μm), and homogeneous.

Next, the ground material obtained is diluted with an appropriate amount of water and an emulsion is thus obtained which is stabilised by an anionic or non-anionic surfactant which is stable in storage.

As for the surfactant (B) of the dispersion of the invention, it is preferably non-ionic. These non-ionic surfactants are of course the same as those that may optionally be added to the emulsions (A) obtained by polymerisation into an emulsion as indicated above.

In the framework of the present invention, anionic surfactants may optionally be employed. As examples, alkali metal salts of aromatic hydrocarbon sulphonic acids or alkylsulphuric acids may be cited and the preferred non-ionic surfactants are the polyethylene alkylphenols or the ethoxylated fatty alcohols.

The amount of usable surfactant is that which is commonly implemented for the placing in emulsion such as described particularly in the above-mentioned patents and in the patent U.S. Pat. No. 2 891 920.

The non-ionic (of preference), ionic or amphoteric surfactants may be employed alone or in a mixture of themselves.

According to an advantageous provision of the invention, the dispersion comprises at least one cross-linking agent which may be formed:

by the silicone resin (C) which is aminoalkylated and optionally salified, the latter comprising to this end molecules which have at least three $OR^3$ groups per molecule, which corresponds to $w+y \leq 2$ in (I)

and/or by the hydroxylated silicone resin (D) capable of reacting with the $OR^a$ groups of (A), and/or by the alkoxysilane (capable of reacting with the $OR^a$ groups of (A)

In fact, it is perfectly conceivable that the reactive cross-linking functions which are capable of reacting with the polydiorganosiloxane oil with reactive terminals (A) in order to form cross-linked networks, belong to one of the constituents (C), (D) or (E) of the dispersion according to the invention or to a mixture thereof.

According to an alternative, the polydiorganosiloxane (A) behaves as a cross-linking agent which comprises at least three cross-linking reactive functions per molecule: $OR^8$ with R=H or $R^a$.

The animated silicon-containing compound (C) (e.g. in the form of a resin), optionally salified and such as defined above especially in the three embodiments, constitutes another object of the present invention both as a novel product per se and as an active additive for cross-linkable and/or cross-linked silicone compositions. This novel additive is, when all is said and done, an original adhesion promoter for silicones, it being possible for said promoter to further have a cross-linking agent function, as has been described above.

The synthesis of this aminoalylated silicone resin (C) takes place, e.g. by rearrangement or redistribution, for example in alkali and alcohol medium, of a polyorganosiloxane with an alkoxysilane which bears the aminated functionality(ies) (cf. U.S. Pat. No. 4,757,106).

The starting alkoxylated polyorganosiloxante can be obtained, in a way known per se by reacting haloaloylsilanes with themselves (for example cohydroalcoholysis of methyl chlorosilane and propyl chlorosilane).

In practice, the reaction medium of the synthesis of (C) is aqueous. It comprises alcohol, for example methanol, associated with a base such as potassium hydroxide. The synthesis by redistribution is advantageously carried out in the hot (e.g. $\geq 50°$ C.) with stirring for a few minutes to several hours In the case where the resin (C) is not intended to be subsequently salified, the pH of the redistribution medium can vary from 1 to 13.

The optional salification of the amine functions of the resin (C) is carried out preferably after grafting said functions onto the alkoxylated polyorganosiloxane resin (C). This salification consists in reacting the amine for example with an acid such as acetic acid and/or HCl in an ethanolic medium (e.g. ethanol). Same for the redistribution, it is preferable to provide thermal energy to the reaction medium so as to improve the kinetics (50° to 200° C. for some hours).

Naturally, it is not possible to exclude the methodological valiant according to which the salification would be carried out before grafting of the amino-functionalised radical onto the resin (C). This only requires some technical adaptations within the reach of the person skilled in the art. According to another salification variant, it is conceivable to see that the latter is carried out in situ in the dispersion, e.g. during the formulation of the mastic.

In the same way of thinking, an in situ synthesis of the aminoalkylated silicone resin C could be envisaged. In order to do this, it would be convenient to incorporate, into the aqueous dispersion of the invention, the alkoxylated polyorganosiloxane resin and the silane which bears the aminoalkylated graft as well as the necessary reagents for the redistribution. An even earlier solution could even be imagined which includes the precursors of the alkoxylated polyorganosiloxane resin, namely the halosilanes.

These methodological considerations on the preparation of (C) are general and, whatever the type of aminated silicon-containing compound, mean:

DTT (N) $OR^3$ resin

DQT (N) $OR^3$ resin

DTD (N) $OR^3$ resin

It is to be noted that in the case where this resin (C) is salified, it is generally necessary to pre-acidify the dispersion, e.g. the mastic, before incorporating the resin (C).

The hydroxylated and/or alkoxylated silicone resin (D) has a hydroxyl and/or alkoxyl groups content by weight of between 0.1 and 10%, preferably between 0.4 and 4%. This resin (D) has, per molecule, at least two different motifs selected from those of formula M, D, T and Q.

As an example of an organic substituent of these motifs, the methyl, ethyl, isopropyl, tertiobutyl, n-hexyl and phenyl radicals may be cited.

These silicone resins are well-known branched organopolysiloxane polymers whose methods of preparation are described in very numerous patents.

As examples of usable resins, MQ resins, MDQ resins, TD resins and MDT resins may be cited.

Resins which are solid or liquid at ambient temperature may be used. These resins may be incorporated into the aqueous emulsions as such, in solution in an organic solvent or a silicone oil, or even in the form of aqueous emulsions.

Aqueous emulsions of usable silicone resins are, for example, described in the patents U.S. Pat. No. 4,028,339, U.S. Pat. No. 4,052,331. U.S. Pat. No. 4,056,492, U.S. Pat. No. 4,525,502 and U.S. Pat. No. 4,717,599 which are cited as reference.

As indicated above, this optional resin (D) can have a cross-linking agent function due to its hydroxyl and/or alkoxyl functions which are capable of reacting with the $OR^a$ of the silicone oil (A) by condensation. The alkoxysilane (E) can play the same cross-lining role as (D), but it can only react with the silicone oil (A) provided that a prior hydrolysis of the $OR^a$ functions has taken place. Such a cross-linking mechanism by condensation is particularly adapted for the monoconstituent formulations or systems.

As examples of alkoxysilane (E), $ViSi (OEt)_3$, $ViSi(OMe)_3$, $Si (OEt)_4$, $MeSi (OMe)_3$, $Si(OMe)_4$ $Me=CH_3$ and $=CH_3$, $CH_2$ may be cited.

The present invention covers notably the dispersions comprising at least a catalyst (F). Thus the metallic catalytic hardening compounds (F) are essentially the carboxylic acids and the halides of metals selected from lead, zinc, zirconium, titanium, iron, tin (Sn II, Sn IV), barium, calcium and manganese.

The constituent (F) is preferably a catalytic tin compound, generally an organotin salt, introduced preferably in the form of an aqueous emulsion. The usable organotin salts are described in particular in the book by NOLL, Chemistry and Technology of Silicones Academic Press (1968), page 337.

The product of the reaction of a tin salt, in particular a tin dicarboxylate, with ethyl polysilicate, may also be used as a catalytic tin compound, as described in the patent U.S. Pat. No. 4,862,919.

The product of the reaction between an alkyl silicate or a trialkoxysilane with dibutyltin diacetate as described in the Belgian patent BE-A-842 305, may also be convenient.

According to another possibility, a tin II salt may be used such as $SnCl_2$ or stannous octoate, The preferred tin salts are the tin bischelates (EP-A-0 147 323 and EP-A-0 235 049), the diorganotin dicarboxylates and in particular the dibutyltin or dioctyltin diversatates (British patent GB-A-1 289 900), dibutyltin or dioctyltin diacetate, dibutyltin or dioctyltin dilaurate. From 0.01 to 3, preferably from 0.05 to 2 parts of organotin salt for 100 parts of (A) are used.

According to the variants, strong acids or bases (KOH, NaOH) or amines (optionally the amine of the resin (C)) may also be used as catalyst (F).

Another constituent of the dispersion according to the invention is a filler (G) which is present at the rate of 0 to 250, preferably from 5 to 200 parts and which is of the semi-reinforcing or stuffing siliceous mineral type ($G_1$) and/or of the reinforcing or semi-reinforcing siliceous type ($G_2$)

The non-siliceous fillers ($G_1$) have a granulometry generally between 1 and 300 $\mu$m and a BET surface lower than 50 $m^2g$.

Examples of fillers ($G_1$) which are usable alone or in mixtures are carbon black, titanium dioxide, aluminium oxide, hydrated alumina, expanded vermiculite, non-expanded vermiculite, calcium carbonate, zinc oxide, mica, talc, iron oxide, barium oxide and slaked lime.

These fillers ($G_1$) are introduced into the emulsion in the form of a dry powder for example by simple mixing.

According to a variant of the invention, it was discovered that if the filler ($G_1$) is more or less constituted only of a filler selected from hydrated alumina, expanded vermiculite, non-expanded vermiculite, according to a content from 5 to 250. preferably from 50 to 200 parts for 100 parts of (A), an elastomer is obtained which has a particularly high flame resistance, which can not be obtained with the other categories of afore-mentioned filler ($G_1$), in particular with aluminium oxide or non-hydrated alumina. Ceramic or aramide fibres may also be incorporated according to the teaching of EP-A-0 212 827 .

The siliceous fillers ($G_2$) are selected from colloidal silica, silica powders from combustion or from precipitation or their mixtures. Silica from combustion is preferred. Semi-reinforcing siliceous fillers such as diatomaceous earths, ground quartz, can however also be used.

Silica powders from combustion and from precipitation are well-known, they are used particularly as fillers in silicone elastomer compositions which can be vulcanised in the hot into a silicone rubber. These powders have an average particle size generally lower than 0.1 $\mu$m and a BET specific surface greater than 50 $m^2/g$, preferably between 150 and 350 $m^2/g$.

According to a variant, for 100 parts of oil (A) (emulsion), a silicon-containing additive (H) may be incorporated which is formed from sodium silicate (0.3 to 30 parts), or from an organosiliconate.

The incorporation of ($G_1$) and/or ($G_2$) into the dispersion considerably increases the viscosity of it, which has thus a pasty character.

It was in fact found in accordance with the present invention that the addition of ($G_1$) and/or ($G_2$) is sufficient to confer a more or less marked "thixotropic" character to the dispersion. The extracted dispersion, for example from a storage cartridge, adheres, without running, onto even a vertical substrate and hardens into an elastomer by evaporation of water at ambient temperature. A non-runny dispersion can be obtained by using calcium carbonate as filler (G) whose average particle diameter is lower than 0.1 $\mu$m. Of course, slight heating (at about 40°–80° C.) of the dispersion in order to accelerate the evaporation of the water is not excluded from the invention.

Various additives may be added to the dispersions according to the present invention which allow modifying their properties and those of the elastomers formed from said dispersions by the water removal. Other adhesion promoters (I) may be incorporated in addition to (C), preferably organotrialkoxysilanes, such as for example vinyltrimethoxysilane, the alkyl silicates such as methyl silicate or ethyl silicate or their products of partial hydrolysis, i.e. the alkyl polysilicates, such as methyl polysilicate and ethyl polysilicate at a rate of 0.1 to 20 parts of adhesion agent for 100 parts of (A).

The organotrialkoxysilanes and the alkyl silicates are preferably of the general formula:

$$R^{10}{}_p Si(OR^{11})_{4-p}$$

in which R is an alkyl radical having from 1 to 4 carbon atoms, $R^{11}$ is $R^{10}$ or vinyl and p is 1 or 0.

As other examples of additives it is possible to cite the antifungals, anti-foamants as well as thickening agents such as carboxymethylcellulose, xanthane gum and polyvinyl alcohol, or dispersing agents such as the sodium polyacrylates or sodium hexametaphosphate.

According to a preferred method of the invention, the aqueous silicone dispersion capable of being cross-linked into an adhesive elastomer is a filled oil-in-water emulsion, whose dry extract is greater than or equal to 40 wt %, preferably 80 wt % and even more preferentially between 80% and 95% by weight.

INDUSTRIAL APPLICATION

The dispersions according to the invention are more particularly suitable in the building trade, in the implementation of mastics, of caulking and sealing materials such as joints or even for preparing films, coatings or other thin layers.

The invention has also for subject all the finished products of which especially the mastics, sealing materials or adhesive films (coatings) comprise the dispersion and/or the cross-linked elastomer obtained from this dispersion.

The dispersions according to the invention can be prepared at least according to two different methodologies according to the envisaged embodiment, namely:

1. The silicone resin (C), amino-functionalised and salified, is introduced in the aqueous continuous phase.

2. The silicone resin (C), amino-functionalised and non salified, is introduced into the silicone oily dispersed phase. It is to be noted that these two embodiments are not exclusive of a third, in which salified resin (C) would be in the dispersed silicone phase.

Case 1

An emulsion is first of all prepared by mixing the reactive terminal-containing polyorganosiloxane, optionally including a cross-linking agent (hydroxylated silicone resin (D) and/or alkoxysilane (E)), the ionic, amphoteric or nono-ionic surfactant (B), preferably non-ionic, optionally at least one part of the filler (G) optionally at least one part of the catalyst (F).

According to an alternative, the polydiorganosiloxane (A) may have been obtained by polymerisation into an emulsion and been used in this form for the preparation of the dispersion.

The water is present in an optimal quantity and the kneading of this mixture is carried out until a fine silicone/water emulsion is obtained which has oily particles of average size preferably lower than 5 $\mu$m.

The pH of the emulsion has been optionally adjusted to a value which is suitable for the prevention of the liberation of the amine from the salified amino-functionalised silicone resin (C) and the precipitation of the latter during its incorporation into the mixture.

In order to pursue the preparation of the dispersion which will correspond to the form of application sought-after, (mastic, joint, sealing material, material for the making of films or coatings), the salified amino-functionalised silicone resin (C), the catalyst (F), if it has not already been totally introduced and the rest of the other optional components of the dispersion (D), (E) or (G) are incorporated. Kneading operations are necessary in order to assure the homogenisation of the mixture.

Case 2

In this case, the viscous silicone oil (A) is mixed with the non-salified amino-functionalised silicone resin (C), with a cross-linking agent if the resin (C) does not possess a cross-linking functionality, and optionally another type of cross-linking agent if it possesses one (hydroxylated resin (D) and/or alokoxysilane (E), optionally a filler (G) and optionally a condensation catalyst (F) for example of the LiOH or organometallic type.

The emulsification of the above mixture then takes place with the aid of ionic or non-ionic surfactants, optionally in a mixture, in the presence of an optimal amount of water. The kneading of the mixture is then carried out until a fine silicone in water emulsion is obtained which has oil particles of preferential size of less than or equal to 5$\mu$.

Compounds cited above or other additives can optionally be added after emulsification.

In a general manner for the cases 1 and 2 above, the dry extract of the emulsion is selected in function of the final application aimed at. For the mastic for example, the dry extract is adjusted to a value preferably greater than or equal to 80% by weight.

The preparation protocols given above for the cases 1 and 2 are recommended methodological protocols but are non-limiting.

For the material application for the formation of coatings or films or for a use such as paint which is capable of being cross-linked into a thin layer, the dispersions according to the invention have preferably a dry extract between 40 and 70% by weight.

The preparations described above correspond to obtaining a precursor system of the cross-linked form of the dispersion of the invention, said precursor being presented in a monocomponent form which is capable of being cross-linked by removing water, for example due to drying resulting from placing in ambient conditions.

The preferred precursor system according to the invention is of the is monocomponent type.

However it may also be multicomponent, for example bicomponent, capable of being cross-linked by mixing the components just before the application.

A bicomponent system is formed from two distinct parts, P1 and P2, which are intended to be mixed in order to form the dispersion; one of these parts P1 and P2 containing the oil (A) and the other containing the cross-linking agent, the catalyst (F) being optionally present in only one of the parts P1 and P2.

These precursor systems constitute other objects fitting perfectly into the framework of the present invention.

The dispersions according to the invention presented above have the great advantage of being stable, easily handled and usable and that they lead to cross-linked elastomers which are endowed with excellent mechanical properties: hardness, resistance to rupture, extension to rupture, elasticity modulus, resilience . . . and, just as well after obtaining them as after ageing.

Furthermore, these cross-linked elastomers have to their credit a low cost price, a good flame resistance, a satisfactory thixotropy and a short cross-linking time. Finally, and above all, these cross-linked elastomers have as major quality their good adhesion on the usual supports such as glass, wood, metals or other ceramic materials.

This offers numerous openings for the invention in the field of mastics, sealing materials, materials for forming thin layer coatings, films (paintings), amongst others.

The examples which follow will allow a better understanding of the invention and will allow one to grasp all its advantages as well as its implementation variants.

EXAMPLES

EXAMPLE I: Preparation of the optionally salified amino-functionalised silicone resin (C)

It is a matter of a DTT(N)(OMe) resin redistributed with aminoethylaminopropyltrimethoxysilane in the presence of ethanolic potassium hydroxide, neutralised by an aqueous solution of hydrochloric acid, then by optionally salifying the amine functions with acetic acid.

Starting materials

Resin noted DTOR, and obtained by cohydromethanolysis of chlorosilanes as follows:

32.62 moles of dimethyldichlorosilane and 32.62 moles of propyltrichlorosilane are placed in a 25 liter reactor. A methanol water mixture of 195.6 moles of methanol and 21.77 moles of water is poured in over 3 hours and fifteen minutes with stirring. The temperature is kept at 25° C. Boiling is brought about at the end of the addition and is maintained for 4 hours and thirty minutes. It is then left to decant for one hour and the upper phase is removed, which represents about 6% of the resin. The residual chlorides are removed by successively adding 1.7; 1.5 and 1.5 kg of methanol which are removed by distillation. Neutralisation is brought about by 0.23 kg sodium bicarbonate for half an hour at 40° C. 4.9 kg are obtained and 4,4 kg after filtration.

This resin has a viscosity η at 25° C.=27, 9 mPa.s and the $^{29}$Si NMR analysis reveals the following distribution of the different motifs:

| MOTIFS | MOLAR % |
|---|---|
| D(OMe) | 0.27 |
| D(OMe)$_2$ | 8.37 |
| D | 39.34 |
| T(OMe)$_3$ | 0.20 |
| T(OMe)$_2$ | 6.56 |
| T(OMe) | 28.80 |
| T | 25.10 |
| MeOSi/Si = 0.51 mol/mol | |

Amount used: 2728 g making 7.37 moles.
Aminated silane of the type N-(2-aminoethyl-3-aminopropyl) trimethoxysilane of formula: (MeO)$_3$Si(CH$_2$)$_3$NH(CH$_2$)$_2$NH$_2$
Amount used: 1004 g making 4.51 mole.
Ethanolic potassium hydroxide KOH-EtOH 0.5 N.
Amount used: 20.5 mmoles KOH.
Hydrochloric acid HCl 10% in H$_2$O
Quantity used: 41 mmoles.

Method
1. Loading:

The DTOR resin and the aminated silane are mixed in a 5 liter reactor. Stirring is done for 30 minutes and then the ethanolic potassium hydroxide is added progressively.

2. Heating:

Heating 6 hours at about 100° C., with stirring.

3. Neutralisation with HCl about 50° C.

At the end of this step 3, 3 732 g of resin are obtained of a viscosity η at 25° C.=48 mPa.s, hereafter designated Res 1. This Res 1 is characterised by $^{29}$Si NMR. The following distribution is obtained:

| MOTIFS | MOLAR % |
|---|---|
| D(OMe)$_2$ | 3.6 |
| D(OMe) | 15.2 |
| D | 14.3 |
| T(OMe)$_3$ + T(N)(OMe)$_3$ | 1.2 |
| T(OMe)$_2$ + T(N)(OMe)$_2$ | 12.2 |
| T(OMe) + T(N)(OMe) | 31.2 |
| T + T(N) | 22.3 |

For a formula (I) of (C):

$$R^1{}_x R^2{}_y (OR^3)_z Si\, O_{4-(x+y+z)/2}$$

this corresponds to:
x+y=1.33
z=0.82 (MeOSi/Si in mol/mol)
Further,

Finally, the mass percentage of N 14 of Res 2.9%.
4. Salification 364 g of Res 2 described previously are added into a 1000 ml capacity three-necked flask A mixture containing 57.6 g of pure acetic acid and 105 g of ethanol is poured in with stirring and under air. The temperature of the liquid mass reaches 30° C. at the end of the addition. The reaction mixture is then heated at 90° C. for 3 hours. Room temperature is then allowed to be attained. The new resin obtained Res 2 is dispersible in water.

The analysis by silicon NMR was carried out in order to characterise the resin:

| MOTIFS | MOLAR % |
|---|---|
| D(OMe)$_2$ | 1% |
| D(OMe) | 12.3% |
| D | 19.1% |
| T(OMe)$_3$ + T(N)(OMe)$_3$ | 0.4% |
| T(OMe)$_2$ + T(N)(OMe)$_2$ | 9.5% |
| T(OMe) + T(N)(OMe) | 31.3% |
| T + T(N) | 26.4% | x + y = 1.32
z = 0.66 (MeOSi/Si mmol/mol)
D/D + T = 32.4%
$^{14}$N = 2.9%

5. An amino-salified resin Res 3 is also prepared which differs from Res 2 in that it assays 2.55% of nitrogen 14.

EXAMPLE II: Obtaining dispersions according to the invention which are in the form of a mastic II.1 Preparation of the emulsion: Formulations of the tests types 1 to 9 introduction into a "MEILI" or "KUSTNER" arm kneader of 100 g of α, ω-dihydroxylated silicone oil (A) of viscosity=80 000 mPa.s, of Mw=about 120 000 and assaying about 300 ppm of OH by weight) then (except in examples 8 and 9)10 g of hydroxylated resin (D) having 2.2% by weight of hydroxyl group and constituted of 70% by weight of CH$_3$ Si O$_{1.5}$ motifs and of 30% by weight of (CH$_3$)$_2$ SiO motifs. The kneading is carried out for 15 minutes.

Either a resin (D') which is that containing 2.2% by weight of OH is used, or a resin (D") which contains 0.4% by weight of OH and which is constituted of MDT motifs.

addition with stirring of 5 g of surfactant (B).

Either CEMULSOL® NP9 (nonylphenol at 9 OE) from RHONE POULENC as surfactant (B'), or RHODASURF IT 70® from RHONE POULENC as surfactant (B") is used.

addition with stirring of 5 g of water, then kneading for 30 minutes 100 g of oil (A) poured in for 15 minutes with stirring kneading for 75 minutes; the concentrated emulsion obtained has an average granulometry of 0.81μ and a median of 0.66μ (measurements made with a COULTER LS® 130).

II.2 . Preparation of the mastic Formulation of the tests type 1 to 9 to 110 g of the preceding concentrated emulsion are added 25 g of demineralised water of dilution with stirring and then 0.12 g of acetic acid (in 20 minutes).

addition of the filler (G) [(G')=carbonate SOCAL 31® from SOLVAY (G")=silica FK 160® from DEGUSSA or SIFRACO® C600] and then kneading for 30 min.;

addition, with stirring, of the catalysing emulsion (F) comprising 37% by weight of dioctyltin dilaurate of the type 70827 A (1.3 g) from RHONE POULENC in 15 min; the pH is equal to 4.

introduction of the liquid salified aminated resin DTOR (2 g) [Res 2 or Res 3] and kneading for 20 min degassing of the mastic under slight vacuum and moderate sting draining and packing of the mastic in polyethylene sealed cartridge.

Every operation is carried out in the cold, with a low water flow in the double envelope of the kneader.

EXAMPLE III: Evaluations

III.1 Initial mechanical properties 24 hours after the preparation of the mastic, the dispersion is spread out with a calibrated blade in order to achieve a film of 2 mm thickness which is left to dry out for 10 days before measuring the following mechanical properties;

the Shore hardness A (DUR) according to the standard ASTM-D-2240.

the resistance to rupture (R/R) according to the standard AFNOR-T 46 002 corresponding to ASTM-D 412, in Mpa, the extension to rupture (A/R) in % according to AFNOR - T 46 002, the elasticity modulus Mod 100 at 100% extension according to the standard AFNOR-T 46 002, in MPa.

III.2 Mechanical properties after accelerated ageing

The preceding mechanical measurements are made again on a mastic stored in a sealed cartridge for 14 days at 50° C.

III.3 Adhesion

QUALITATIVE MEASUREMENT: 24 hours after the preparation of the mastic, it is deposited in the form of a strand of 3 mm thickness on a clear glass support and on concrete. After drying the test tubes for 14 days, the level of adhesion is evaluated in creating an initial rupture section with a cutter blade at the interface between the dry mastic and the support, and then in seeking to spread this rupture by peeling. The adhesion is considered:

excellent (noted +++) when the strand cannot be unstuck from its support (cohesive rupture)

good (noted ++) when the strand is unstuck with difficulty and by small surfaces mediocre (noted +) when the strand is unstuck quite easily, even if a few fixing points remain on the periphery.

nil (noted 0) when the strand is unstuck without difficulty with a perfectly adhesive rupture.

QUANTATIVE MEASUREMENT: (only on test No 4)

A sticking test tube is constituted by squeezing a parallelepiped of mastic (12×6×50 mm) between 2 glass or concrete test tubes (mastic/support interface=50×6 mm) and non-stick teflon wedges. A mastic/air interface of 50×12 mm is left free so as to permit the drying of the mastic.

Figure 1:
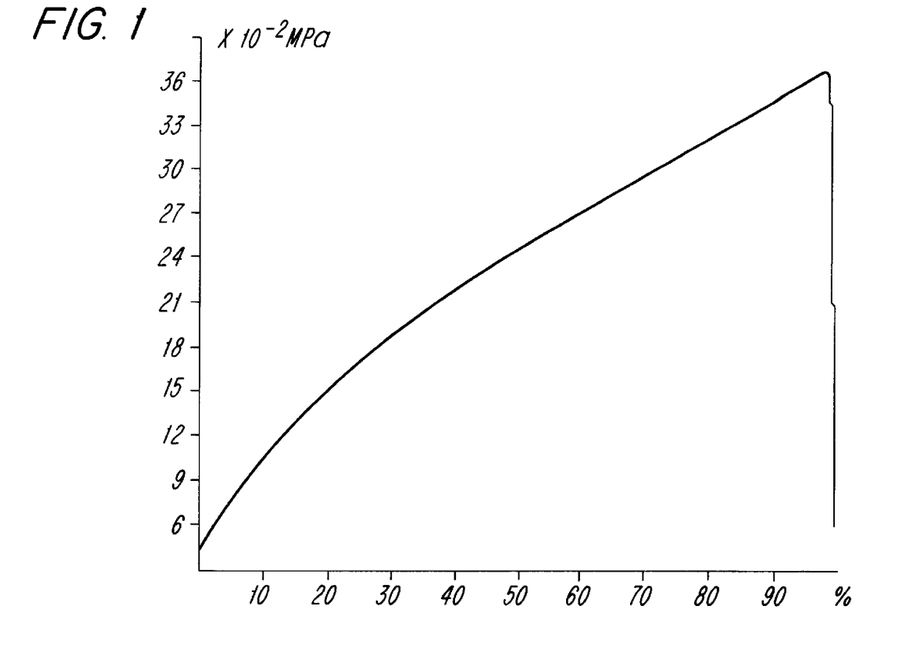
FIG. 1 and 2 represent traction curves of the % of extension obtained for glass and concrete supports. See Example III.
Figure 2:
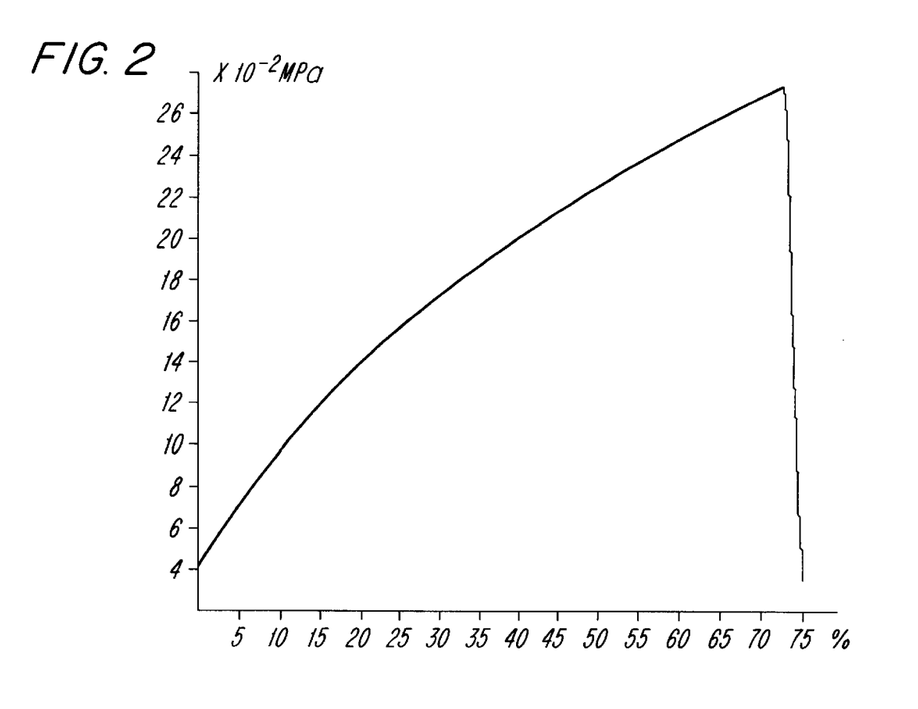

The total drying period is 28 days, but the wedges are taken out of the assembly after a few days so as to facilitate drying. The test tube which has dried for 28 days is drawn out in a dynamometer, the traction curve thus obtained allowing determining the extension and the force (or modulus) corresponding to the rupture of the support/mastic/support complex (sandwich). The mode of rapture is examined, which may be adhesive (at the mastic/support interface) or cohesive (within the mastic). The traction curves in function of the % of extension [(FIG. 1 and FIG. 2)=obtained respectively for concrete and glass supports], are provided in the annex.

The protocol the measurement of the adhesion used here corresponds to the standard ISO NF EN 28339, except in what concerns the size of the parallelepiped: 12×6×50 mm instead of 12×12×50 mm,

EXAMPLE IV: Compositions and results

These data are combined in the summary table below.

Comparative Test 1 carried out with calcium carbonate and at neutral pH gelifies in the presence of the salified aminated silicone resin during the storage of the mastic in cartridge; it is necessary to work with acidic fillers (silicas) and at slightly acid pHs.

Control test 2 without aminated DT T (N) (OMe) resin. This formulation is non-adhesive on glass and is unstable (gelification in the ageing test).

Test 3 carried out by replacing the resin Res 2 by aminoethylaminopropyltrimethoxysilane shows that at the same total content of nitrogen in the mastic, the adhesion obtained in the case of test 4 is not found.

Test 4 containing 2 phr (parts by weight for 100 parts of oil) of salified aminated silicone resin DTT(N)(OMe) referenced Res 2.

Test 5 confirms the results of test 4 in the case where the silica (G") (precipitated silica from DEGUSSA) has been replaced by ground quartz filler (G''') (SIFRACO C600) and the salified aminated resin DTT (N)OMe Res 2 by a similar resin Res 3 which is slightly lower in nitrogen.

Test 6; test carried out with the surfactant (B")= (RHODASURF IT 070 from RHONE POULENC, polyoxyethylene isotridecyl alcohol at 7 OE in the place of (B)) and with the resin (D")=Resin from RHONE POULENC at 5000 ppm of OH by weight, instead of the resin (D') from RHONE POULENC, at 20000 ppm of OH.

Test 7: test carried out by doubling the content of surfactant

Tests 8 and 9: Tests carried out in the absence of hydroxylated silicone resin in the silicone dispersed phase, the salified aminated silicone resin DT T(N)(OMe) (Res 2) dispersed in the aqueous continuous phase playing a double role of cross-linking agent and adhesion promoter. It is noted that for test 8 opposite to other tests, the adhesion is kept after accelerated ageing of the mastic in cartridge (for 14 days at 50° C.).

SUMMARY TABLE

| | TEST | | | | | | | | |
|---|---|---|---|---|---|---|---|---|---|
| | 1 | 2 | 3 | 4 | 5 | 6 | 7 | 8 | 9 |
| Nature surficant | B' | B' | B' | B' | B' | B" | B" | B" | B" |
| Amount TA | 2.5 | 2.5 | 2.5 | 2.5 | 2.5 | 2.5 | 5 | 2.5 | 25 |
| Resin (D) (5 phr) | D' | D' | D' | D' | D | D" | D" | | |
| Filler: | G' | G" | G" | G" | G''' | G''' | G''' | G" | G''' |
| amount phr | 20 | 5 | 5 | 5 | 40 | 40 | 40 | 5 | 40 |
| pH: (adjusted CH$_3$COOH) | 7 | 4.5 | 4.5 | 4 | 4.5 | 4.5 | 4.5 | 5.5 | 5 |

SUMMARY TABLE

| | TEST | | | | | | | | |
|---|---|---|---|---|---|---|---|---|---|
| | 1 | 2 | 3 | 4 | 5 | 6 | 7 | 8 | 9 |
| Adhesion promoter (Phr) | Res 2 | | aminopropyltri-methoxysilane | Res 2 | Res 3 | Res 3 | Res 3 | Res 2 | Res 3 |
| Comments | Taken in the cartridge | Unstability linked to the silica | Does not stick | | | | | sticks after ageing at 50° C. | unstable |
| Adhesion | | | | | | | | | |
| concrete | ++ | 0 | +++ | +++ | +++ | +++ | +++ | +++ | +++ |
| glass | | 0 | 0 | ++ | ++ | + | + | +++ | +++ |
| Initial mechanical properties | | | | | | | | | |
| Hardness (Sh.A) | | 8.5 | 13 | 17 | 20 | 16 | 16 | 6 | 8 |
| Resistance/Rupture (MPa) | | 0.59 | 0.56 | 0.61 | 0.91 | 0.6 | 0.68 | 0.53 | 0.45 |
| Extension/Rupture (%) | | 486 | 257 | 214 | 254 | 234 | 278 | 532 | 530 |
| Mod100 (MPa) | | 0.19 | 0.27 | 0.37 | 0.42 | 0.31 | 0.33 | 0.14 | 0.19 |
| Mechanical properties after 14 days at 50° C. | | | | | | | | | |
| Hardness (ShA) | | taken in the cartridge | 18 | 23 | 30 | 25 | 25 | 19 | taken in the cartridge |
| Resistance/Rupture (MPa) | | | 0.75 | 0.92 | 1.75 | 1.57 | 1.7 | 0.71 | |
| Extension/Rupture (%) | | | 215 | 161 | 187 | 230 | 238 | 178 | |
| Mod100 (MPa) | | | 0.39 | 0.58 | 1.02 | 0.68 | 0.69 | 0.51 | |
| Adhesion concrete | | | 0 | 0 | 0 | 0 | 0 | + | |
| Adhesion glass | | | 0 | 0 | 0 | 0 | 0 | ++ | |
| Initial extrusion | | | +++ | +++ | + | +++ | +++ | +++ | |
| after ageing | | | ++ | ++ | ++ | | ++ | + | |

We claim:

1. An aqueous silicone dispersion capable of being cross-linked into an elastomer by removal of water and, optionally, alcohol and/or carboxylic acid, said dispersion comprising:

at least one polydiorganosiloxane (A) having at least two condensable or hydrolyzable $OR^a$ groups per molecule with $R^a$=H or alkyl;

at least one surfactant (B), at least one aminated silicon-containing compound (C) comprising one or more recurring units of the following average formula (I):

$$R^1_x R^2_y (OR^3)_z SiO_{4-(x+y+z)/2}$$

in which:

$R^1$ represents a monovalent group which is free from nitrogen, is identical or different from one recurring unit to the other, and corresponds to hydrogen, a $C_1$–$C_6$ alkyl, an aryl or a $C_2$–$C_8$ alkenyl, optionally substituted;

$R^2$ represents a monovalent hydrocarbon group which is linked to silicon by a Si—C bond and which contains at least one nitrogen atom, and is identical or different from one recurring group to the other;

$R^3$ is a hydrocarbon group comprising from 1 to 18 carbon atoms;

x, y and z are integers or positive decimals lower than 4; and x+y+z<4;

optionally, at least one hydroxylated and/or alkoxylated silicone resin (D);

optionally at least one alkoxysilane (E) which donates $-OR^a$ terminals of the polydiorganosiloxane (A);

optionally at least one condensation catalyst (F);

and optionally at least one optionally siliceous filler (G);

wherein the aminated silicon compound (C) is a resin, at least one of said one or more recurring units is alkoxylated, and in formula (I), x, y and z are defined by:

x+y<2

0<x<2

0<y<1

$0.2 \leq z \leq 1$.

2. The dispersion according to claim 1, wherein in formula (I), x, y and z correspond to:

1<x<1.8

0.1<y<0.8

$0.4 \leq z \leq 1.0$.

3. The dispersion according to claim 1, wherein the aminated silicon-containing compound (C) is a polyorganosiloxane comprising D, T, T(N), and $(OR^3)$ in which:

$D=R^1_2SiO_{2/2}$ $T=R^1SiO_{3/2}$ $T(N)=R^2SiO_{3/2}$ wherein:

$R^1$, $R^2$ and $R^3$ are as defined in claim 1 and the terminal $-OR^3$ radicals are carried by D and/or T and/or T(N);

the molar ratio D/(D+T) is between 5 and 50%; and the mass percentage of nitrogen 14 with respect to the totality of the polyorganosiloxane (A) is greater than or equal to 0.5%.

4. The dispersion according to claim 1, wherein the aminated silicon-containing compound (C) is a polyorganosiloxane comprising D, Q, T(N) and $(OR^3)$ in which:

$D=R^1_2SiO_{2/2}$ $T(N)=R^2SiO_{3/2}$ $Q=SiO_{4/2}$ wherein:
R$^1$, R$^2$ and R$^3$ are as defined in claim 1, and the terminal —OR$^3$ radicals are carried by D and/or T(N);

the molar ratio D/(D+Q) is between 5 and 50%; and the mass percentage of nitrogen 14 with respect to the totality of the polyorganosiloxane (A) is between 1 and 3%.

5. The dispersion according claim 1, wherein the aminated silicon-containing compound is a polyorganosiloxane comprising D, T, D(N) and (OR$^3$) in which:

D=R$^{12}$SiO$_{2/2}$
D(N)=R$^1$R$^2$SiO$_{2/2}$
T=R$^1$SiO$_{3/2}$ wherein:
R$^1$, R$^2$ and R$^3$ are as defined in claim 1 and the terminal —OR$^3$ radicals are carried by D and/or D(N);

the molar ratio D/(D+T) is between 5 and 50%, and the mass percentage of nitrogen 14 compared to the totality of the polyorganosiloxane (A) is greater than or equal to 0.5%.

6. The dispersion according to claim 1, wherein the radical R$^2$ of the formula (I) has the following formula:

$$(R^4)_2NR^5—$$

in which:
the R$^4$ groups are identical or different and represent hydrogen or —R$^6$—NH$_2$,
the R$^5$ and R$^6$ groups are divalent C$_1$–C$_{10}$ alkylene radicals which are optionally substituted.

7. The dispersion according to claim 1, wherein the radical R$^2$ of the formula (I) has the following formula:

$$(R^4)_2NR^5—$$

in which the R$^4$ groups together form a 5–7 membered ring containing at least one heteroatom and the R$^5$ group is a divalent C$_1$–C$_{10}$ alkylene radical which is optionally substituted.

8. The dispersion according to claim 1, wherein the aminated silicon-containing compound is salified and comprises one or more R$^2$ radicals of the formula —R$^5$N$^+$(R$^4$)$_3$X$^-$ in which the R$^4$ groups are identical or different and represent hydrogen or —R$^6$—NH$_2$ and the R$^5$ group is a divalent C$_1$–C$_{10}$ alkylene radical which is optionally substituted and X$^-$ represents a counter-anion selected from the group consisting of carboxylates and halides.

9. The dispersion according to claim 1, comprising:
100 parts by weight of the silicone oil (A) with terminals of formula:

$$—O—Si\,(OR^a)_t(R^b)_{3-t}$$

in which R$^a$ is as defined in claim 1, and R$^b$=H or C$_1$–C$_6$ hydrocarbon radical and t=1,2 or 3, this oil having a viscosity η at 25° C., greater than or equal to 20,000 mPa.s;

0.5 to 10 parts by weight of the surfactant (B) selected from the group consisting of ionic, amphoteric and non-ionic surfactants;

0.5 to 10 parts by weight of the aminoalkylated silicone resin (C), optionally salified;

0 to 20 parts by weight of at least one hydroxylated silicone resin (D) having, per molecule:

at least one R$^7$SiO$_{1.5}$ unit and one or more units selected from the group consisting of R$^7{}_3$SiO$_{0.5}$, R$^7{}_2$SiO and SiO$_2$; or at least one SiO$_2$ unit and one or more units selected from the group consisting of R$^7{}_3$SiO$_{0.5}$, R$^7{}_2$SiO and R$^7$SiO$_{1.5}$;

wherein the R$^7$ radicals are identical or different, and are selected from the group consisting of vinyl, phenyl, 3,3,3-trifluoropropyl radicals, and the linear or branched alkyl radicals having from 1 to 6 carbon atoms inclusive, said resin (D) having a hydroxyl group content by weight between 0.1 and 10%, 0 to 5 parts by weight of the alkoxysilane (E) of formula R$^b{}_{3-t}$Si(OR$^a$)$_{t+1}$ in which R$^a$, and R$^b$ are identical or different and, t is defined above, 0 to 3 parts by weight of the condensation catalyst (F), 0 to 250 parts by weight of the optionally siliceous reinforcing filler.

10. The dispersion according to claim 9, wherein R$^b$ is a (cyclo)alkyl or alkenyl.

11. The dispersion according to claim 1, wherein the aminated silicone resin (C) is salified and comprises molecules having at least three OR$^3$ groups per molecule; and/or the silicone resin (D) is a hydroxylated silicone resin (D) capable of reacting with the OR$^a$ groups of (A).

12. The dispersion according to claim 1, wherein the polydiorganosiloxane (A) behaves as a cross-linking agent comprising, per molecule, at least three cross-linking reactive functions R$^a$.

13. The dispersion according to claim 1, comprising the catalyst (F).

14. The dispersion according to claim 1, wherein the dispersion is in the form of an emulsion of oil in water whose dry extract is greater than or equal to 40 wt %.

15. The dispersion according to claim 1, wherein R$^1$ is selected from the group consisting of methyl, ethyl, propyl 3,3,3-trifluoropropyl, vinyl, allyl and phenyl.

16. An adhesive mastic, sealing material, film or coating comprising a dispersion according to claim 1 and/or a cross-linked elastomer derived from said dispersion.

17. An aminated silicon-containing compound comprising one or more recurring units of the following average formula (I):

$$R^1{}_xR^2{}_y(OR^3)_zSiO_{4-(x+y+z)/2}$$

in which:
R$^1$ represents a monovalent group which is free from nitrogen, is identical or different from one recurring unit to the other, and corresponds to hydrogen, a C$_1$–C$_6$ alkyl, an aryl or a C$_2$–C$_8$ alkenyl, optionally substituted;

R$^2$ represents a monovalent hydrocarbon group which is linked to silicon by a Si—C bond and which contains at least one nitrogen atom, and is identical or different from one recurring unit to the other;

R$^3$ is a hydrocarbon group comprising from 1 to 18 carbon atoms;

x, y and z are integers or positive decimals lower than 4; and x+y+z<4, wherein at least one of said one or more recurring units of formula (I) is alkoxylated, said compound being a resin, and in formula (I), x, y and z are defined by:

x+y<2

1<x<1.8

0.1<y<0.8

0.4≦z≦1.0.

18. The compound according to claim 17, wherein the compound is a polyorganosiloxane comprising D, T, T(N) and (OR$^3$) in which:

D=R$^1_2$SiO$_{2/2}$

T=R$^1$SiO$_{3/2}$

T(N)=R$^2$SiO$_{3/2}$ wherein:

R$^1$, R$^2$ and R$^3$ are as defined in claim 17 and the terminal —OR$^3$ radicals are carried by D and/or T and/or T(N); and the molar ratio D/(D+T) is between 5 and 50%.

19. The compound according to claim 17, wherein the compound is a polyorganosiloxane comprising D, Q, T(N) and (OR$^3$) in which:

D=R$^1_2$SiO$_{2/2}$

T(N)=R$^2$SiO$_{3/2}$

Q=SiO$_{4/2}$ wherein:

R$^1$, R$^2$ and R$^3$ are as defined in claim 17 and the terminal —OR$^3$ radicals are carried by D and/or T(N); and the molar ratio D/(D+Q) is between 5 and 50%.

20. The compound according to claim 17, wherein the compound is a polyorganosiloxane comprising D, T, D(N) and (OR$^3$) in which:

D=R$^1_2$SiO$_{2/2}$

D(N)=R$^1$R$^2$SiO$_{2/2}$

T=R$^1$SiO$_{3/2}$ wherein R$^1$, R$^2$ and R$^3$ are as defined in claim 17 and the terminal —OR$^3$ radicals are carried by D and/or D(N), the molar ratio D/(D+T) is between 5 and 50%.

21. The compound according to claim 17, wherein the radical R$^2$ of the formula (I) has the following formula:

(R$^4$)$_2$NR$^5$— in which:

the R$^4$ groups are identical or different and represent hydrogen or —R$^6$—NH$_2$, the R$^5$ and R$^6$ groups are divalent C$_1$–C$_{10}$ alkylene radicals which are optionally substituted.

22. The dispersion according to claim 1, wherein the radical R$^2$ of the formula (I) has the following formula:

(R$^4$)$_2$NR$^5$— in which the R$^4$ groups together form a 5–7 membered ring containing at least one heteroatom and the R$^5$ group is a divalent C$_1$–C$_{10}$ alkylene radical which is optionally substituted.

23. The compound according to claim 17, wherein the compound is salified and comprises one or more R$^2$ radicals of the formula —R$^5$N$^+$(R$^4$)$_3$, X$^-$, in which the R$^4$ groups are identical or different and represent hydrogen or —R$^6$—NH$_2$ and the R$^5$ group is a divalent C$_1$–C$_{10}$ alkylene radical which is optionally substituted, and X$^-$ represents a counter-anion selected from the group consisting of carboxylates and halides.

24. The compound according to claim 17, wherein R$^1$ is selected from the group consisting of methyl, ethyl, propyl 3,3,3-trifluoropropyl, vinyl, allyl and phenyl.

25. An active additive for silicone compositions which are cross-linked or capable of being cross-linked, comprising the aminated silicone resin (C) as defined in claim 17.

* * * * *